United States Patent
Shiraishi (10) Patent No.: US 10,391,692 B2
(45) Date of Patent: Aug. 27, 2019

(54) INJECTION MOLDING SYSTEM

(71) Applicant: FANUC Corporation, Yamanashi (JP)

(72) Inventor: Wataru Shiraishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 225 days.

(21) Appl. No.: 15/371,459

(22) Filed: Dec. 7, 2016

(65) Prior Publication Data

US 2017/0165891 A1    Jun. 15, 2017

(30) Foreign Application Priority Data

Dec. 11, 2015  (JP) ................................. 2015-242278

(51) Int. Cl.

| | |
|---|---|
| B29C 45/00 | (2006.01) |
| B29C 45/84 | (2006.01) |
| B29C 45/76 | (2006.01) |
| B29C 45/17 | (2006.01) |
| B29C 45/14 | (2006.01) |

(52) U.S. Cl.
CPC ........ B29C 45/842 (2013.01); B29C 45/1769 (2013.01); B29C 45/76 (2013.01); B29C 45/0053 (2013.01); B29C 45/7686 (2013.01); B29C 2045/1486 (2013.01); B29C 2945/761 (2013.01); B29C 2945/7613 (2013.01); B29C 2945/7629 (2013.01); B29C 2945/76163 (2013.01); B29C 2945/76167 (2013.01); B29C 2945/76294 (2013.01); B29C 2945/76421 (2013.01)

(58) Field of Classification Search
CPC ................................................... B29C 45/842
See application file for complete search history.

(56) References Cited

U.S. PATENT DOCUMENTS

2012/0075624 A1    3/2012    Suzuki et al.

FOREIGN PATENT DOCUMENTS

| JP | 64-31614 A | 2/1989 |
|---|---|---|
| JP | 4-238013 A | 8/1992 |
| JP | 2000-52351 A | 2/2000 |
| JP | 2000-238108 A | 9/2000 |
| JP | 2005-144263 A | 6/2005 |
| JP | 2011206710 A | 10/2011 |
| JP | 2012073155 A | 4/2012 |
| JP | 2013-86358 A | 5/2013 |

OTHER PUBLICATIONS

Office Action in JP Application No. 2015-242278, dated Nov. 21, 2017, 11 pp.

*Primary Examiner* — Ryan M Ochylski (74) *Attorney, Agent, or Firm* — Hauptman Ham, LLP (57) ABSTRACT

An injection molding system includes a plurality of inspection apparatuses for inspecting molded article quality, a unit that transports a molded article molded by an injection molding machine, a molded article containment unit that is provided for each of types of post-treatment operations needed for the molded article, a transport destination designation unit that selects and designates the molded article containment unit to contain the molded article on the basis of a combination of inspection results from the plurality of inspection apparatuses, and a molded article sorting and transport unit that sorts and transports the molded article into the molded article containment unit designated by the transport destination designation unit.

11 Claims, 4 Drawing Sheets

FIG.2

| DESTINATION OF TRANSPORT BY ROBOT | INSPECTION 1 | INSPECTION 2 | INSPECTION 3 | POST-TREATMENT | ALARM DETAILS |
|---|---|---|---|---|---|
| CONTAINER C1 | A | A | A | NON-DEFECTIVE ARTICLE | NO ALARM |
| CONTAINER C2 | A | A | B | VISUAL INSPECTION | (a) REVIEW OF METERING CONDITION |
| CONTAINER C3 | A | B | A | DEBURRING | (b) REVIEW OF INJECTION CONDITION |
| CONTAINER C4 | A | B | B | VISUAL INSPECTION + DEBURRING | (a) + (b) |
| CONTAINER C5 | B | A | A | NON-DEFECTIVE ARTICLE (CLASS-B) | (c) REVIEW OF INSERT ARTICLE MANUFACTURING PROCESS |
| CONTAINER C6 | B | A | B | VISUAL INSPECTION (CLASS-B) | (a) + (c) |
| CONTAINER C7 | B | B | A | DEBURRING (CLASS-B) | (b) + (c) |
| CONTAINER C8 | B | B | B | DISPOSAL | STOPPING OF CONTINUOUS RUNNING |
|  |  | C |  |  |  |

| SHOT NUMBER | CYCLE TIME | METERING TIME | METERING TORQUE | MINIMUM CUSHION | PEAK PRESSURE | CONTAINER C1 | CONTAINER C2 | CONTAINER C3 |
|---|---|---|---|---|---|---|---|---|
| shot | sec | sec | % | mm | MPa | | | |
| 1 | 37.03 | 11.60 | 26.9 | 6.04 | 94.4 | 1 | 0 | 0 |
| 2 | 37.02 | 11.73 | 27.1 | 6.05 | 94.5 | 0 | 0 | 1 |
| 3 | 37.02 | 11.74 | 27.4 | 6.03 | 94.0 | 1 | 0 | 0 |
| 4 | 37.03 | 11.76 | 27.5 | 6.03 | 93.9 | 1 | 0 | 0 |
| 5 | 37.03 | 11.75 | 27.5 | 6.04 | 93.9 | 1 | 0 | 0 |
| 6 | 37.03 | 11.80 | 26.7 | 6.01 | 93.7 | 0 | 1 | 0 |
| 7 | 37.02 | 11.68 | 26.9 | 6.07 | 93.8 | 1 | 0 | 0 |
| 8 | 37.03 | 11.70 | 27.4 | 6.04 | 93.8 | 1 | 0 | 0 |
| 9 | 37.02 | 11.69 | 27.2 | 6.00 | 93.9 | 0 | 1 | 0 |
| 10 | 37.03 | 11.72 | 27.2 | 6.04 | 93.8 | 1 | 0 | 0 |
| 11 | 37.02 | 11.73 | 27.1 | 6.04 | 94.0 | 1 | 0 | 0 |
| 12 | 37.03 | 11.72 | 27.1 | 6.05 | 94.9 | 0 | 0 | 1 |
| 13 | 37.02 | 11.77 | 27.1 | 6.04 | 94.1 | 1 | 0 | 0 |
| 14 | 37.02 | 11.72 | 27.1 | 6.03 | 94.6 | 0 | 0 | 1 |
| 15 | 37.02 | 11.73 | 27.1 | 6.02 | 94.1 | 1 | 0 | 0 |
| 16 | 37.03 | 11.78 | 27.0 | 6.03 | 94.2 | 1 | 0 | 0 |
| 17 | 37.01 | 11.74 | 27.1 | 5.98 | 93.9 | 0 | 1 | 0 |
| 18 | 37.03 | 11.71 | 26.9 | 6.03 | 94.2 | 1 | 0 | 0 |
| 19 | 37.03 | 11.71 | 27.1 | 6.04 | 94.8 | 0 | 0 | 1 |
| 20 | 37.03 | 11.75 | 26.9 | 6.02 | 94.3 | 1 | 0 | 0 |

FIG.4B

| COEFFICIENT OF CORRELATION | CONTAINER C1 | CONTAINER C2 | CONTAINER C3 |
|---|---|---|---|
| METERING TIME | −0.06 | 0.17 | −0.08 |
| METERING TORQUE | 0.23 | −0.24 | −0.06 |
| MINIMUM CUSHION | 0.34 | −0.78 | 0.29 |
| PEAK PRESSURE | −0.42 | −0.37 | 0.83 |

INJECTION MOLDING SYSTEM

RELATED APPLICATIONS

The present application claims priority to Japanese Patent Application Number 2015-242278, filed Dec. 11, 2015, the disclosure of which is hereby incorporated by reference herein in its entirety.

BACKGROUND OF THE INVENTION

1. Field of the Invention

The present invention relates to an injection molding system for inspecting a molded article molded by an injection molding machine and classifying the molded article in accordance with an inspection result.

2. Description of the Related Art

An article inspection and classification system for inspecting an article with an inspection apparatus to make a pass/fail judgment or the like and sorting the article in accordance with a result of the judgment has already been known in various fields. For example, Japanese Patent Application Laid-Open No. 2011-206710 describes a system for inspecting an article with a metal inspection unit, a shape inspection unit, and a weighing inspection unit and sorting the article into a sorting direction D0 for a pass, a sorting direction D1 for a weight-related failure, or a sorting direction D2 for a shape-related failure or a metal-related failure on the basis of inspection results from the inspection units. Japanese Patent Application Laid-Open No. 2012-73155 describes a magnetic disk inspection apparatus for inspecting a magnetic disk with an inspection unit and grading the magnetic disk in accordance with defects severity grade determined by, for example, the sizes or number of detected flaws or foreign matters.

It is also known that a robot is used to transport a molded article into an inspection apparatus or the like, and a pass/fail judgment or the like is made on the basis of an inspection result from the inspection apparatus to classify the molded article, in an injection molding system.

In an injection molding system, an inspection apparatus for a molded article or the like is provided, the inspection apparatus inspects a molded article, and a pass/fail judgment or the like on the molded article is made on the basis of a result of the inspection. A method for the inspection and judgment is merely a method that divides articles into two groups, non-defective articles and defective articles, or a method that performs classification in accordance with defective article type or defect grade as disclosed in Japanese Patent Application Laid-Open No. 2011-206710 and Japanese Patent Application Laid-Open No. 2012-73155.

If a molded article is inspected and judged as a defective article, the defective article can be made into a non-defective article by subjecting the defective article to a post-treatment. A post-treatment process, however, depends on the details of a defect. The cause of occurrence of a defect depends on the type and details of the defect. Measures to be taken for preventing the occurrence of a defect depend on the type and details of the defect.

SUMMARY OF THE INVENTION

Under the circumstances, an object of the present invention is to provide an injection molding system which facilitates selection of a post-treatment for a molded article if a defect appears in the molded article and to provide an injection molding system which facilitates adoption of remediation measures against defective molding.

An injection molding system according to the present invention is one including a plurality of inspection apparatuses for inspecting molded article quality, a unit that transports a molded article molded by an injection molding machine, a molded article containment unit that is provided for each of types of post-treatment operations needed for the molded article, a transport destination designation unit that selects and designates the molded article containment unit to contain the molded article on the basis of a combination of inspection results from the plurality of inspection apparatuses, and a molded article sorting and transport unit that sorts and transports the molded article into the molded article containment unit designated by the transport destination designation unit. Molded articles molded by the injection molding machine are grouped and contained such that molded articles in each group need the same post-treatment. This facilitates a post-treatment operation.

The injection molding system further includes an insert article inspection apparatus that inspects an insert article to be inserted into a mold and a unit that inserts the insert article into the mold, and the transport destination designation unit selects and designates the molded article containment unit to contain the molded article on the basis of inspection results from the plurality of inspection apparatuses and the insert article inspection apparatus.

In the injection molding system, the plurality of inspection apparatuses include an inspection apparatus that outputs two or more types of inspection results on the basis of a plurality of criteria for determination. The injection molding system further includes a counter that counts the number of molded articles contained in the molded article containment unit and an alarm generation unit that outputs an alarm if a value of the counter is not less than a set value set in advance. The injection molding system further includes a total number counter that counts the number of molded articles molded by the injection molding machine, a counter for each of the molded article containment units that counts the number of molded articles contained in the molded article containment unit, a unit that obtains an occupancy ratio of molded articles in each molded article containment unit from a value of the total number counter and a value of the counter for each of the molded article containment unit, and an alarm generation unit that outputs an alarm if the obtained occupancy ratio exceeds an allowable value set in advance.

In the injection molding system, details of measures to respond to the alarm are displayed on a display unit when the alarm is output by the alarm generation unit.

In the injection molding system, a storage unit and an analysis unit are provided. The storage unit stores physical quantity data on molding when the molded article is molded by the injection molding machine and at least one of a piece of inspection result data from the inspection apparatus and a piece of data on a molded article containment destination designated by the transport destination designation unit in association with each other and the analysis unit analyzes a correlation between the physical quantity data on molding and the inspection result data or the data on the molded article containment destination on the basis of the data stored in the storage unit. An analysis result from the analysis unit is displayed on the display unit when an alarm is output by the alarm generation unit.

In the injection molding system, a storage unit and an analysis unit are provided. The storage unit stores physical quantity data on molding when the molded article is molded by the injection molding machine and at least one of a piece of inspection result data from the inspection apparatus and a piece of data on a molded article containment destination designated by the transport destination designation unit in association with each other and the analysis unit analyzes a correlation between the physical quantity data on molding and the inspection result data or the data on the molded article containment destination on the basis of the data stored in the storage unit. The data stored in the storage unit and an analysis result from the analysis unit are displayed on the display unit in accordance with a molding physical quantity display instruction.

In the injection molding system, the unit that transports the molded article and the molded article sorting and transport unit are constructed from one robot, and the robot is configured to transport the molded article and sort and transport the molded article into the molded article containment unit. In the injection molding system, the unit that inserts the insert article into the mold, the unit that transports the molded article, and the molded article sorting and transport unit are constructed from one robot, and the robot is configured to insert the insert article into the mold, transport the molded article, and sort and transport the molded article into the molded article containment unit.

According to the present invention, molded articles are contained in containers such that molded articles in each container need the same post-treatment. This facilitates post-treatment selection. Additionally, remediation measures against defective molding are determined for each container, and it is possible to easily cope with defective molding.

BRIEF DESCRIPTION OF THE DRAWINGS

The above and other objects and features of the present invention will be apparent from the following description of embodiments with reference to the appended drawings, in which.

DETAILED DESCRIPTION OF THE PREFERRED EMBODIMENTS

A first embodiment of the present invention will be described below with reference to the drawings.

Figure 1:
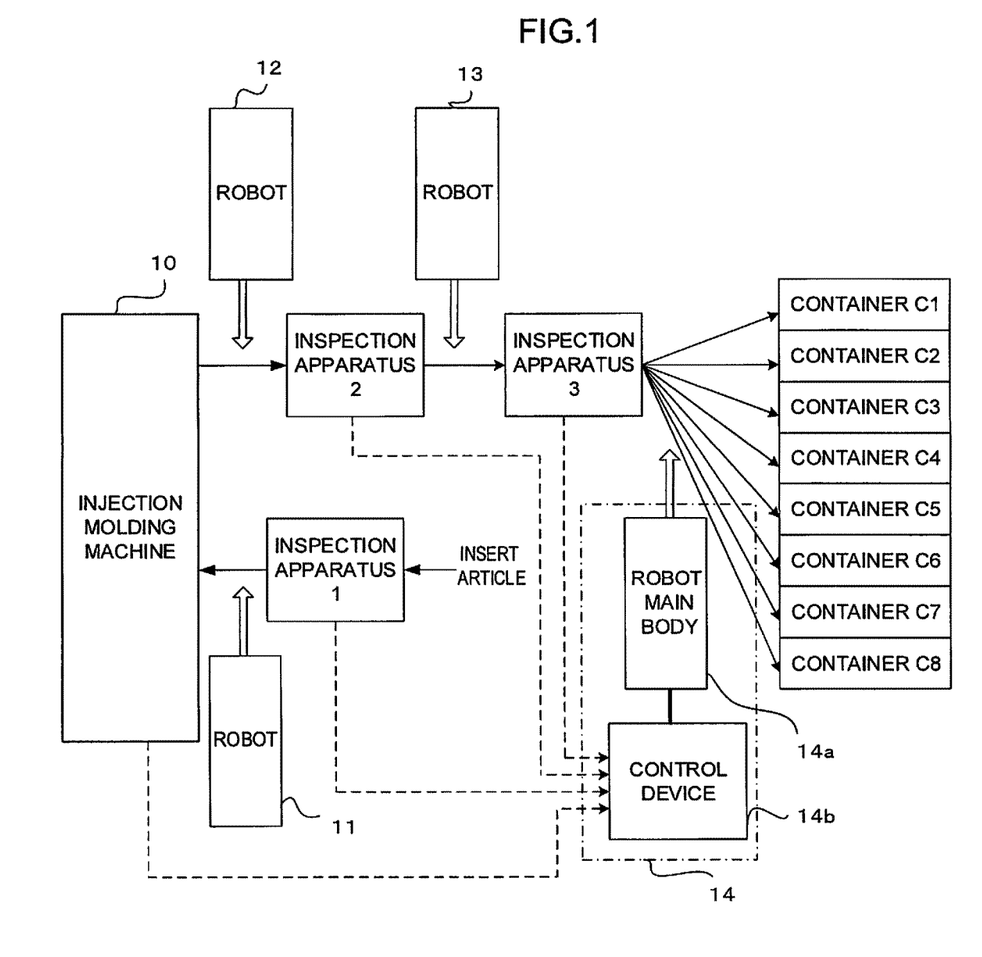
FIG. 1 is a schematic diagram of a first embodiment of the present invention.

FIG. 1 is a schematic diagram of the first embodiment of the present invention. The first embodiment illustrates an example including three inspection apparatuses for inspecting, for example, whether a molded article molded by an injection molding machine 10 passes or fails. Apparatuses for various inspections for judging whether a molded article passes or fails, the quality of the molded article, and the like may be adopted as the inspection apparatuses. The various inspections include weight inspection of a molded article, dimensional inspection of a magnified and projected image of a molded article, burr inspection, short shot inspection, and inspection as to whether each of the shape, color, and the like of an insert article or a molded article falls within an allowable range for a non-defective article through analysis of an image of an article to be inspected picked up by an image shooting camera. In the first embodiment, three inspection apparatuses are provided, and the three inspection apparatuses are an insert article appearance inspection apparatus 1 which performs appearance inspection on an insert article to be inserted into a mold of the injection molding machine 10, a burr inspection apparatus 2 which performs burr inspection on a molded article, and a short shot inspection apparatus 3 which detects defective molding due to a short shot arising from an insufficient amount of resin charged.

An insert article insertion robot 11 which inserts an insert article into the mold, a molded article removal robot 12 which removes a molded article from the mold, a molded article movement robot 13, and a molded article sorting and transport robot 14 which sorts and transports molded articles into eight containers C1 to C8 are further provided. The inspection apparatuses 1 to 3 and a control device 14b of the robot 14 are connected by communication lines, and inspection results from the inspection apparatuses 1 to 3 are sent to the control device 14b of the robot 14. Note that although connection between the control device 14b of the molded article sorting and transport robot 14 and a control device of the injection molding machine 10 by a communication line is shown in FIG. 1, a control device of the insert article insertion robot 11 and a control device of the molded article removal robot 12 are also connected to the control device of the injection molding machine 10 by communication lines. The connection is not shown in FIG. 1.

After the insert article appearance inspection apparatus 1 performs appearance inspection on an insert article, the insert article insertion robot 11 inserts the insert article into the mold. After injection molding, the molded article removal robot 12 removes a molded article from the mold. The burr inspection apparatus 2 performs burr inspection on the molded article, and the molded article movement robot 13 moves the molded article. The short shot inspection apparatus 3 performs short shot inspection. Inspection results from the inspection apparatuses 1 to 3 are sent to the control device 14b of the robot 14. The control device 14b of the robot 14 determines the sorting destination of the molded article on the basis of the inspection results from the inspection apparatuses 1 to 3 and transports the molded article into any one of the containers C1 to C8 with a main body 14a of the robot 14. A molded article sorting destination is determined for each of types of post-treatments needed, and a post-treatment for each molded article contained in each of the containers C1 to C8 depends on the container.

A plurality of criteria for determination may be established for each of the inspection apparatuses 1 to 3. In the present embodiment, molded articles are judged by being classified into three groups A, B, and C, and criteria for determination for classifying a molded article into group A, B, or C are set in advance in each of the inspection apparatuses 1 to 3. Molded articles classified into group C are defective articles and articles to be disposed of. Molded articles classified into group A or B are temporarily regarded as non-defective articles, and a molded article sorting destination specific to a needed post-treatment is determined in accordance with a combination of judgment results. Note that the criteria for determination are set so as to satisfy:

allowable value upper limit>group B>group A>group B>allowable value lower limit.

Figure 2:
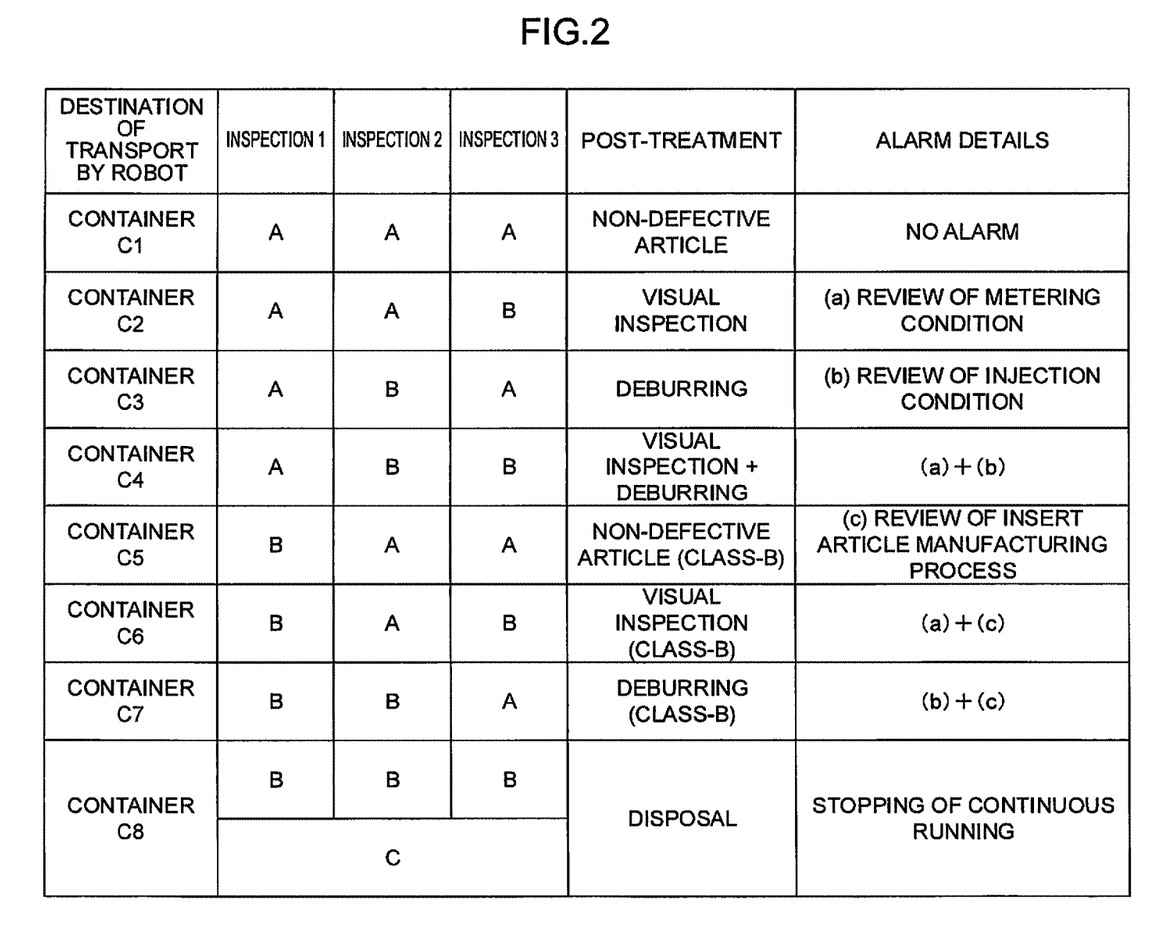
FIG. 2 is an explanatory chart for explaining the relationship among inspection results, a molded article sorting destination, a post-treatment, and details of an alarm, according to the first embodiment.

FIG. 2 is a chart representing the relationship between each combination of results of inspections by the inspection apparatuses 1 to 3 and a container into which a molded article is to be sorted and transported, the relationship with a post-treatment for the molded article, and the relationship with operation processing, by which an alarm is to be called off when the alarm is generated. In the first embodiment, an alarm is output when the number of molded articles sorted into a container becomes not less than a set value.

If inspection results from all the inspection apparatuses 1 to 3 show that a molded article falls under group A, the molded article is a non-defective article and is sorted into the container C1. Molded articles contained in the container C1 are non-defective articles, no post-treatment is needed, and no alarm is generated. If the insert article appearance inspection apparatus 1 and the burr inspection apparatus 2 determine that a molded article falls under group A, and the short shot inspection apparatus 3 determines that the molded article falls under group B, it is conceivable that the amount of resin charged is insufficient to cause a short shot and that the appearance is incomplete so that the molded article is sorted into the container C2. The article sorted into the container C2 requires a visual inspection as a post-treatment. If the number of molded articles sorted into the container C2 becomes not less than a set value and an alarm is generated, it is conceivable that the amount of resin charged is insufficient, for example. With the alarm, an operator is prompted to review metering conditions.

If the insert article appearance inspection apparatus 1 and the short shot inspection apparatus 3 determine that a molded article falls under group A, and the burr inspection apparatus 2 determines that the molded article falls under group B, the molded article is sorted into the container C3, and burr inspection on the molded article is needed as a post-treatment. If the number of molded articles sorted into the container C3 becomes not less than a set value and an alarm is generated, an operator is prompted to revise injection conditions of the machine such that a maximum allowable injection pressure is reduced automatically for eliminating excessive burr, or a VP switching position, i.e. a position for switching an injection process to a dwelling process is shifted automatically to prevail the dwelling process at earlier timing to reduce the amount of resin charged into the mold.

If the insert article appearance inspection apparatus 1 determines that a molded article falls under group A, and the burr inspection apparatus 2 and the short shot inspection apparatus 3 determine that the molded article falls under group B, the molded article is sorted into the container C4, and required is a post-treatment such as visual inspection and burr inspection on the molded article. If the number of molded articles sorted into the container C4 becomes not less than a set value and an alarm is generated, an operator is prompted with the alarm to review the metering conditions and the injection conditions.

If the insert article appearance inspection apparatus 1 determines that a molded article falls under group B, and the burr inspection apparatus 2 and the short shot inspection apparatus 3 determine that the molded article falls under group A, the molded article is sorted into the container C5, and a post-treatment is grading of the molded article as a lowerranked (class-B) molded article. If the number of molded articles sorted into the container C5 becomes not less than a set value and an alarm is generated, an operator is prompted with the alarm to review an insert article manufacturing process.

If the insert article appearance inspection apparatus 1 and the short shot inspection apparatus 3 determine that a molded article falls under group B, and the burr inspection apparatus 2 determines that the molded article falls under group A, the molded article is sorted into the container C6, and grading of the molded article as a lower-ranked (class-B) molded article and visual inspection on the molded article are needed as a post-treatment. If the number of molded articles sorted into the container C6 becomes not less than a set value and an alarm is generated, an operator is prompted with the alarm to review the metering conditions and to review the insert article manufacturing process.

If the insert article appearance inspection apparatus 1 and the burr inspection apparatus 2 determine that a molded article falls under group B, and the short shot inspection apparatus 3 determines that the molded article falls under group A, the molded article is sorted into the container C7, and grading of the molded article as a lower-ranked (class-B) molded article and deburring of the molded article are needed as a post-treatment. If the number of molded articles sorted into the container C7 becomes not less than a set value and an alarm is generated, an operator is prompted with the alarm to review the injection conditions and to review the insert article manufacturing process.

If all the inspection apparatuses 1 to 3 determine that a molded article falls under group B, the molded article has class-B quality. Since the molded article is just barely within an allowable range for every inspection, the molded article is sorted into the container C8 as one to be disposed of. If any one of the inspection apparatuses 1 to 3 determines that a molded article falls under class C, the molded article is sorted into the container C8 as one to be disposed of. If a molded article is sorted into the container C8, an alarm is generated and the operation of the injection molding machine 10 is stopped.

Figure 3:
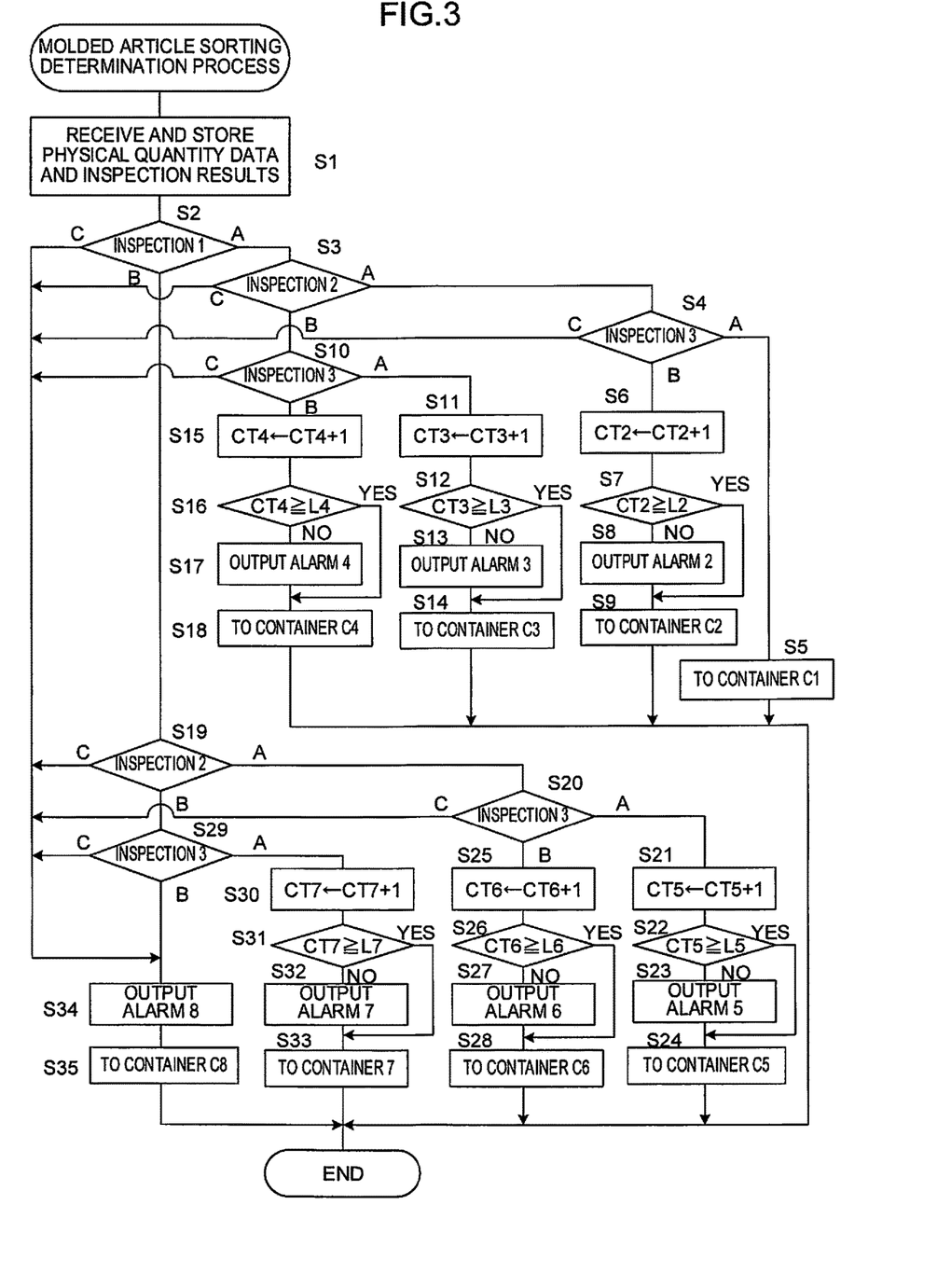
FIG. 3 is a flowchart showing the algorithm for a molded article sorting process according to the first embodiment.

FIG. 3 is a flowchart showing the algorithm for a molded article sorting determination process to be performed by the control device 14b of the robot 14 each time a molded article is molded by the injection molding machine 10.

The control device 14b receives, from the injection molding machine 10, physical quantity data on molding, such as a cycle time, a maximum injection pressure, a minimum cushion amount, a metering time, metering torque, and a peak pressure upon molded the article in the injection molding machine 10, and receives an inspection result (group A, group B, or group C) from each of the inspection apparatuses 1 to 3. The control device 14b stores the physical quantity data on molding and the inspection results in association with each other in a storage unit in the control device 14b (step S1).

The control device 14b judges which one of group A, group B, and group C the inspection result of the inspection apparatus 1 is (step S2). Note that the inspection result of each inspection apparatus will be expressed as A, B, or C below if the inspection result is group A, group B, or group C.

When the inspection result of the insert article appearance inspection apparatus 1 is judged to be A in step S2, the control device 14b then judges the inspection result of the burr inspection apparatus 2 (step S3). When the inspection result of the burr inspection apparatus 2 is judged to be A, the control device 14b then judges the inspection result of the short shot inspection apparatus 3 (step S4). When the inspection result of the short shot inspection apparatus 3 is A, the inspection results from the inspection apparatuses 1, 2, and 3 are all A. In this case, the molded article is a non-defective article, and the control device 14b puts the robot main body 14a into action and causes the robot main body 14a to transport the molded article into the container C1 (step S5).

When the inspection result of the short shot inspection apparatus 3 is judged to be B in step S4, that is, in the case of a combination of A from the insert article appearance inspection apparatus 1, A from the burr inspection apparatus 2, and B from the short shot inspection apparatus 3, the control device 14b adds 1 to a counter CT2 (step S6) and judges whether a value of the counter CT2 is not less than a set value L2 (step S7). If the value is below the set value L2, the control device 14b drives the robot main body 14a to transport the molded article into the container C2 (step S9). Note that the counter CT2 is intended to count the number of molded articles transported into the container C2 and that the set value L2 is set in advance. If the number of molded articles transported into the container C2 has become not less than the set value L2, an alarm is issued, and an operator is prompted to review the metering conditions as described earlier. If it is determined in step S7 that the value of the counter CT2 is not less than the set value L2, the control device 14b outputs alarm 2, displays alarm 2 on a display which is provided at the control device 14b or the injection molding machine 10, and displays a message prompting a review of the metering conditions. As will be described later, the control device 14b obtains and displays coefficients of correlation between each of the physical quantity data on molding stored in step S1 and each container (or each combination of inspection results) (step S8) and shifts to step S9.

The counter CT2 and counters CT3, CT4, CT5, CT6, and CT7 (to be described later) are counters which count the numbers of molded articles transported into the containers C2, C3, C4, C5, C6, and C7, respectively. The above-described set value L2 and set values L3, L4, L5, L6, and L7 (to be described later) are set values for generating an alarm and are set in advance. At the start of continuous molding of molded articles, the counters CT2 to CT7 are reset in initialization.

When the inspection result of the burr inspection apparatus 2 is judged to be B in step S3, the control device 14b then shifts to step S10 and judges the inspection result of the short shot inspection apparatus 3. When the inspection result of the short shot inspection apparatus 3 is A (with A from the inspection apparatus 1 and B from the inspection apparatus 2), the control device 14b then adds 1 to the counter CT3 (step S11) and judges whether a value of the counter CT3 is not less than the set value L3 (step S12). If the value is below the set value L3, the control device 14b drives the robot main body 14a to transport the molded article into the container C3 (step S14). If the value of the counter CT3 has become not less than the set value L3, the control device 14b shifts from step S12 to step S13 to output alarm 3, displays a message prompting a review of the injection conditions on the display, obtains the coefficients of correlation between each of the physical quantity data on molding and each container (or each combination of inspection results) and displays the coefficients of correlation on the display, and transports the molded article into the container C3.

When the inspection result of the short shot inspection apparatus 3 is judged to be B in step S10 (with A from the inspection apparatus 1 and B from the inspection apparatus 2), the control device 14b then adds 1 to the counter CT4 (step S15) and judges whether a value of the counter CT4 is not less than the set value L4 (step S16). If the value is below the set value L4, the control device 14b drives the robot main body 14a to transport the molded article into the container C4 (step S18). If the value of the counter CT4 has become not less than the set value L4, the control device 14b shifts from step S16 to step S17 to output alarm 4, displays a message prompting a review of the metering conditions and the injection conditions on the display, obtains the coefficients of correlation between each of the physical quantity data on molding and each container (or each combination of inspection results) and displays the coefficients of correlation on the display, and transports the molded article into the container C4.

When the inspection result of the insert article appearance inspection apparatus 1 is judged to be B in step S2, the control device 14b then shifts to step S19 and judges the inspection result of the burr inspection apparatus 2. When the inspection result is A, the control device 14b then judges the inspection result of the short shot inspection apparatus 3 (step S20). When the inspection result is A, which means B from the insert article appearance inspection apparatus 1, A from the burr inspection apparatus 2, and A from the short shot inspection apparatus 3, the control device 14b adds 1 to the counter CT5 (step S21) and judges whether a value of the counter CT5 is not less than the set value L5 (step S22). If the value is below the set value L5, the control device 14b drives the robot main body 14a to transport the molded article into the container C5 (step S24). If the value of the counter CT5 has becomes not less than the set value L5, the control device 14b shifts from step S22 to step S23 to output alarm 5, displays a message prompting a review of the insert article manufacturing process on the display, obtains the coefficients of correlation between each of the physical quantity data on molding and each container (or each combination of inspection results) and displays the coefficients of correlation on the display, and transports the molded article into the container C5.

When the inspection result of the short shot inspection apparatus 3 is judged to be B in step S20 (with B from the insert article appearance inspection apparatus 1 and A from the burr inspection apparatus 2), the control device 14b then adds 1 to the counter CT6 (step S25) and judges whether a value of the counter CT6 is not less than the set value L6 (step S26). If the value is below the set value L6, the control device 14b drives the robot main body 14a to transport the molded article into the container C6 (step S28). If the value of the counter CT6 has become not less than the set value L6, the control device 14b shifts from step S26 to step S27 to output alarm 6, displays a message prompting a review of the metering conditions and a review of the insert article manufacturing process on the display, obtains the coefficients of correlation between each of the physical quantity data on molding and each container (or each combination of inspection results) and displays the coefficients of correlation on the display, and transports the molded article into the container C6.

When the inspection result of the burr inspection apparatus 2 is judged to be B in step S19, the control device 14b then shifts to step S29 to judge the inspection result of the short shot inspection apparatus 3. When the inspection result is A (with B from the insert article appearance inspection apparatus 1 and B from the burr inspection apparatus 2), the control device 14b then adds 1 to the counter CT7 (step S30) and judges whether a value of the counter CT7 is not less than the set value L7 (step S31). If the value is below the set value L7, the control device 14b drives the robot main body 14a to transport the molded article into the container C7 (step S33). If the value of the counter CT7 has become not less than the set value L7, the control device 14b shifts from step S31 to step S32 to output alarm 7, displays a message prompting a review of the injection conditions and a review of the insert article manufacturing process on the display, obtains the coefficients of correlation between each of the physical quantity data on molding and each container (or each combination of inspection results) and displays the coefficients of correlation, and transports the molded article into the container C7.

When the inspection result of the short shot inspection apparatus 3 is judged to be B in the process in step S29, that is, if the inspection results from the insert article appearance inspection apparatus 1, the burr inspection apparatus 2, and the short shot inspection apparatus 3 are judged to be B, B, and B, respectively, the control device 14b outputs alarm 8, and obtains the coefficients of correlation between each of the physical quantity data on molding and each container (or each combination of inspection results) and displays the coefficients of correlation on the display (step S34). The control device 14b stops the operation of the injection molding machine 10 and transports the molded article into the container C8 with the robot 14 (step S35).

In the above-described manner, molded articles are sorted in accordance with the types of post-treatments the molded articles need and are sorted into the containers C1 to C8.

Molded articles contained in the container C1 are treated as a non-defective article, and molded articles contained in the container C2 need visual inspection as a post-treatment. Molded articles contained in the container C3 need deburring as a post-treatment. Molded articles contained in the container C4 need deburring and visual inspection as a post-treatment. Molded articles contained in the container C5 need to be treated as a class-B article low in quality. Molded articles contained in the container C6 need visual inspection and needs to be treated as a class-B article low in quality. Molded articles contained in the container C7 need deburring and also needed to be treated as a class-B article low in quality. Molded articles contained in the container C8 are disposed of as defective articles. As described above, post-treatment operations required for each molded article contained in each container depend on the container, and a worker can easily select and perform any of the needed post-treatments.

If an alarm is generated, an operation for improvement or review is displayed. This allows a worker to easily take measures.

Note that although an alarm is generated when the number of molded articles contained in a container becomes not less than a set value in the above-described embodiment, an occupancy ratio of the articles in the container may also be obtained, and an alarm may be generated on the basis thereof. In this case, in the process shown in FIG. 3, a process of incrementing, by 1, a total number counter which counts the total number of molded articles may be added to the process in step S1, a process of dividing the value of the counter CT2, CT3, CT4, CT5, CT6, or CT7 by a value of the total number counter to obtain the occupancy ratio and a process of judging whether the occupancy ratio exceeds a set allowable percentage may be added instead of each of the judgment processes in steps S7, S12, S16, S22, S26, and S31, and an alarm may be output if it is judged that the obtained occupancy ratio exceeds the set allowable percentage.

Although physical quantity data on molding and inspection results from the inspection apparatuses are stored in association with each other in step S1 in the above-described embodiment, a piece of data on the containment destination of a molded article, that is, a piece of data indicating a container containing the molded article may be additionally stored. A piece of data on the containment destination (a piece of container data) of a molded article may be stored instead of inspection results from the inspection apparatuses. To store a piece of data on a containment destination, a process of storing the data on the containment destination (a piece of data indicating a container containing a molded article) in association with physical quantity data on molding may be added to an instruction for sorting into the container in step S5, S9, S14, S18, S24, S28, S33, or S35.

Figure 4A:
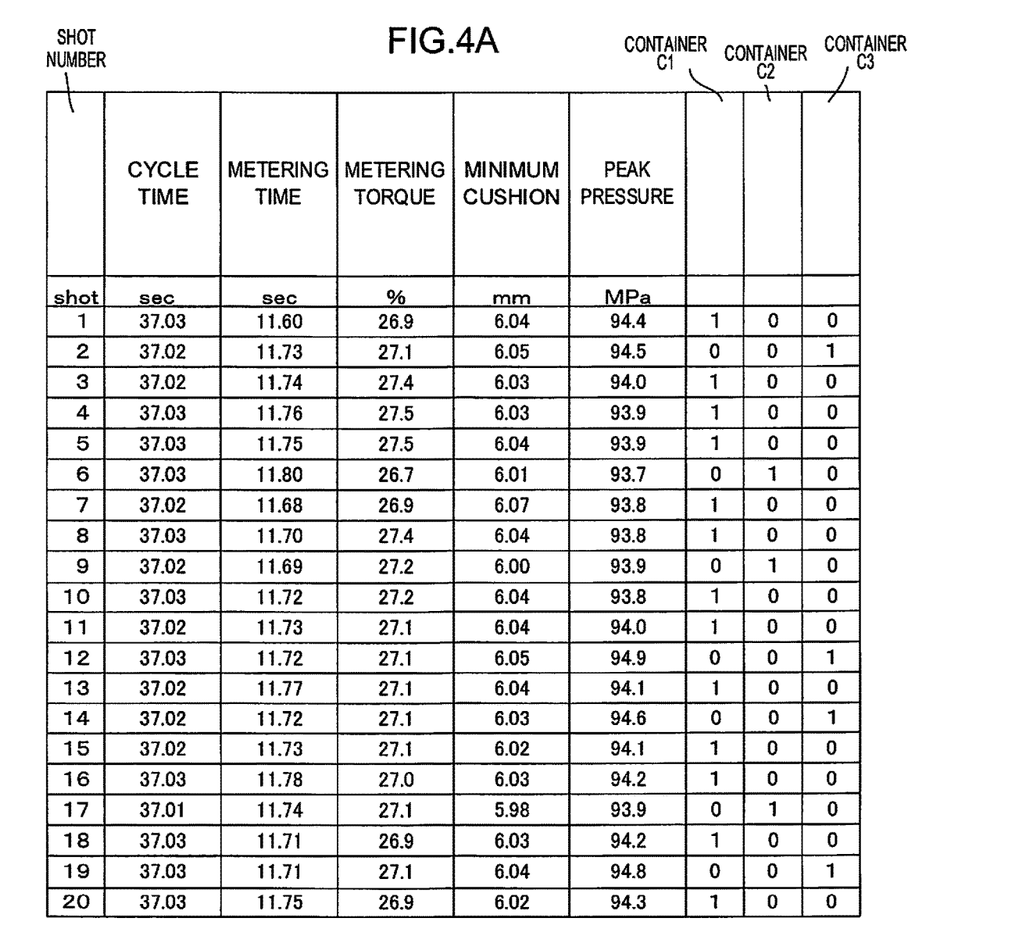
FIGS. 4A and 4B are charts showing examples of stored pieces of molding physical quantity data and a piece of data on a container containing a molded article and examples of coefficients of correlation obtained by analyzing the pieces of data, according to the first embodiment.
Figure 4B:
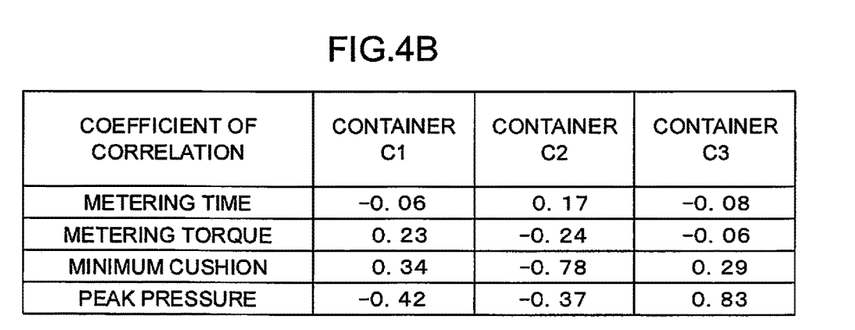

FIG. 4A shows an example of a stored data when physical quantity data on molding stored in step S1 shown in FIG. 3 are stored with an additional data on a container containing a molded article (inspection result data are not shown). FIG. 4B is a chart showing a result of analyzing a correlation when a coefficient of correlation between each physical quantity data and molded articles contained in each container is obtained from stored data. In FIGS. 4A and 4B, the containers C4 to C8 are not shown.

When a worker inputs a physical quantity data display instruction, physical quantity data on molding as shown in FIG. 4A which are stored in a storage unit, a piece of data on a container in which a molded article is contained, and inspection result data are displayed, a coefficient of correlation between physical quantity data on molding and each container is obtained by analyzing the data, and the coefficients of correlation are displayed, as shown in FIG. 4B. A coefficient of correlation takes a numerical value between −1 and +1, and an absolute value of 0.7 or more indicates a strong correlation. In the example shown in FIG. 4B, there is an inverse correlation between a minimum cushion and the container C2, and there is a correlation between a peak pressure and the container C3.

As described earlier, when an alarm is generated during the molded article sorting determination process (step S8, S13, S17, S23, S27, S32, or S34), a coefficient of correlation between the physical quantity data on molding and each container as shown in FIG. 4B is similarly obtained and displayed. In this case as well, physical quantity data on molding as shown in FIG. 4A and a piece of data on a container and/or inspection result data may be displayed.

Second Embodiment

Although each inspection apparatus classifies molded articles using two criteria for determination established for division of molded articles into three classes, A, B, and C in the above-described first embodiment, each inspection apparatus may divide molded articles into two types, non-defective articles and defective articles, using one criterion for determination and output inspection results. For example, if each inspection apparatus in FIG. 1 outputs an inspection result of non-defective or defective, a molded article is sorted and transported into a corresponding one of containers in the manner below, depending on a combination of inspection results:

inspection apparatus 1=non-defective, inspection apparatus 1=non-defective, inspection apparatus 1=non-defective→container C1;

inspection apparatus 1=non-defective, inspection apparatus 1=non-defective, inspection apparatus 1=defective→container C2;

inspection apparatus 1=non-defective, inspection apparatus 1=defective, inspection apparatus 1=non-defective→container C3;

inspection apparatus 1=non-defective, inspection apparatus 1=defective, inspection apparatus 1=defective→container C4;

inspection apparatus 1=defective, inspection apparatus 1=non-defective, inspection apparatus 1=non-defective→container C5;

inspection apparatus 1=defective, inspection apparatus 1=non-defective, inspection apparatus 1=defective→container C6;

inspection apparatus 1=defective, inspection apparatus 1=defective, inspection apparatus 1=non-defective→container C7; and inspection apparatus 1=defective, inspection apparatus 1=defective, inspection apparatus 1=defective→container C8.

In a molded article sorting determination process, possible inspection results from each of the inspection apparatuses 1 to 3 are only non-defective and defective. The molded article sorting determination process is different from the process shown in FIG. 3 only in that an inspection result of "A" from each inspection apparatus is replaced with an inspection result of "non-defective", "B" is replaced with "defective", and there is no inspection result corresponding to "C". Other respects are the same as in the flowchart of the process shown in FIG. 3.

Post-treatments for molded articles contained in the containers C1 to C8 and measures to be displayed at the time of alarm generation are the same. That is, the relationship between a combination of inspection results and a container into which a molded article is sorted and transported, the relationship with a post-treatment for a molded article, and the relationship with operation processing by which an alarm is to be called off when the alarm is generated that are shown in FIG. 2 are the same as in the first embodiment. An inspection result of "A" in FIG. 2 is replaced with "non-defective", and "B" is replaced with "defective".

There are three classes in the first embodiment, and there are two classes in the second embodiment. Depending on determination reference values for classification, molded articles contained in the container C1 in the second embodiment may be more likely to include ones lower in precision than molded articles contained in the container C1 in the first embodiment (for example, a case where a determination reference value for discrimination between non-defective articles and defective articles in the second embodiment is set to be intermediate between a determination reference value for group A and a determination reference value for group B in the first embodiment) or the number of molded articles contained in the containers C2 to C7 may be larger in the second embodiment than in the first embodiment (for example, a case where a determination reference value for non-defective articles in the second embodiment is set to be equal to the determination reference value for group A in the first embodiment). Note that the number of groups for classification of molded articles need not be the same for all inspection apparatuses. One inspection apparatus may make a division into three groups, A, B, and C, and another apparatus may make a division into two groups, A (non-defective) and C (defective), to output an inspection result.

Although the molded article sorting determination process shown in FIG. 3 may be performed by the control device 14b of the molded article sorting and transport robot 14 in each of the above-described embodiments, the molded article sorting determination process may be performed by the control device of the injection molding machine 10, the control device of the insert article insertion robot 11, the control device of the molded article removal robot 12, or a control device of the molded article movement robot 13. In this case, the apparatus that performs the process shown in FIG. 3 and the inspection apparatuses 1 to 3 and the control device of the injection molding machine 10 may be connected by communication lines, an instruction for sorting into a corresponding container in step S5, S9, S14, S18, S24, S28, S33, or S35 may be sent to the control device 14b of the molded article sorting and transport robot 14, and the molded article sorting and transport robot 14 may be made to perform a sorting action.

Although transport of an insert article, insertion of the insert article into a mold, removal of a molded article from the mold and transport of the molded article, transfer between inspection apparatuses, and sorting and transport into containers are performed by four robots in each of the above-described embodiments, one articulated robot may be configured to perform the operations. This allows a reduction in the cost of system construction.

In a system including a central control apparatus which manages a plurality of injection molding machines and the like, the central control apparatus, the injection molding machines, and inspection apparatuses may be connected by communication lines, a control device of the central control apparatus may execute the process shown in FIG. 3, an instruction for sorting into a corresponding container in step S5, S9, S14, S18, S24, S28, S33, or S35 may be sent to the control device 14b of the molded article sorting and transport robot 14, and the molded article sorting and transport robot 14 may be made to perform a sorting action.

The embodiments of the present invention have been described above. The present invention is not limited to the examples of the above-described embodiments and can be carried out in other aspects by being appropriately changed.

The invention claimed is:

1. An injection molding system including a plurality of inspection apparatuses for inspecting molded article quality, the injection molding system comprising:
   a unit that transports a molded article molded by an injection molding machine;
   a molded article containment unit that is provided for each of types of post-treatment operations needed for the molded article;
   a transport destination designation unit that selects and designates the molded article containment unit to contain the molded article on the basis of a combination of inspection results from the plurality of inspection apparatuses;
   a molded article sorting and transport unit that sorts and transports the molded article into the molded article containment unit designated by the transport destination designation unit;
   an insert article inspection apparatus that inspects an insert article to be inserted into a mold; and
   a unit that inserts the insert article into the mold, wherein the transport destination designation unit selects and designates the molded article containment unit to contain the molded article on the basis of inspection results from the plurality of inspection apparatuses and the insert article inspection apparatus.

2. The injection molding system according to claim 1, wherein the plurality of inspection apparatuses includes an inspection apparatus that outputs two or more types of inspection results on the basis of a plurality of criteria for determination.

3. The injection molding system according to claim 1, further comprising:

a counter that counts the number of molded articles contained in the molded article containment unit; and an alarm generation unit that outputs an alarm if a value of the counter is not less than a set value set in advance.

4. The injection molding system according to claim 1, further comprising:
a total number counter that counts the number of molded articles molded by the injection molding machine;
a counter for each of the molded article containment units that counts the number of molded articles contained in the molded article containment unit;
a unit that obtains an occupancy ratio of molded articles in each molded article containment unit from a value of the total number counter and a value of the counter for each of the molded article containment unit; and
an alarm generation unit that outputs an alarm if the obtained occupancy ratio exceeds an allowable value set in advance.

5. The injection molding system according to claim 3, wherein details of measures to respond to the alarm are displayed on a display unit when the alarm is output by the alarm generation unit.

6. The injection molding system according to claim 3, wherein
a storage unit, the storage unit storing physical quantity data on molding when the molded article is molded by the injection molding machine and at least one of a piece of inspection result data from the inspection apparatus and a piece of data on a molded article containment destination designated by the transport destination designation unit in association with each other, and an analysis unit, the analysis unit analyzing a correlation between the physical quantity data on molding and the inspection result data or the data on the molded article containment destination on the basis of the pieces of data stored in the storage unit, are provided, and
an analysis result from the analysis unit is displayed on the display unit when an alarm is output by the alarm generation unit.

7. The injection molding system according to claim 1, wherein
a storage unit, the storage unit storing physical quantity data on molding when the molded article is molded by the injection molding machine and at least one of a piece of inspection result data from the inspection apparatus and a piece of data on a molded article containment destination designated by the transport destination designation unit in association with each other, and an analysis unit, the analysis unit analyzing a correlation between the physical quantity data on molding and the inspection result data or the data on the molded article containment destination on the basis of the data stored in the storage unit, are provided, and
the data stored in the storage unit and an analysis result from the analysis unit are displayed on the display unit in accordance with a molding physical quantity display instruction.

8. The injection molding system according to claim 1, wherein the unit that transports the molded article and the molded article sorting and transport unit are constructed from one robot, and the robot is configured to transport the molded article and sort and transport the molded article into the molded article containment unit.

9. The injection molding system according to claim 1, wherein the unit that inserts the insert article into the mold, the unit that transports the molded article, and the molded article sorting and transport unit are constructed from one robot, and the robot is configured to insert the insert article into the mold, transport the molded article, and sort and transport the molded article into the molded article containment unit.

10. An injection molding system, comprising:
an injection molding machine;
an insert article inspection apparatus configured to inspect an insert article to be inserted into a mold of the injection molding machine for molding a molded article;
a plurality of inspection apparatuses configured to inspect the molded article;
a plurality of containers each for one of different post-treatment operations to be performed for the molded article;
a controller configured to select and designate one container among the plurality of containers to contain the molded article on the basis of a combination of inspection results from the plurality of inspection apparatuses and the insert article inspection apparatus; and
at least one robot configured to
insert the insert article having been inspected by the insert article inspection apparatus into the mold,
transport the molded article molded by the injection molding machine to the plurality of inspection apparatuses, and
sort and transport the molded article having been inspected by the plurality of inspection apparatuses into the one container designated by the controller.

11. The injection molding system according to claim 10, wherein the plurality of inspection apparatuses includes an inspection apparatus configured to output two or more types of inspection results on the basis of a plurality of criteria for determination.

* * * * *